(12) United States Patent
Schroeder et al.

(10) Patent No.: US 8,260,314 B2
(45) Date of Patent: Sep. 4, 2012

(54) BUSINESS HOUR NOTIFICATION DELIVERY (75) Inventors: Derek Andrew Schroeder, Caldwell, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 197 days.

(21) Appl. No.: 12/707,075

(22) Filed: Feb. 17, 2010

(65) Prior Publication Data
US 2011/0201346 A1  Aug. 18, 2011

(51) Int. Cl.
H04W 24/00 (2009.01)
(52) U.S. Cl. ............ 455/456.1; 455/466; 701/408
(58) Field of Classification Search .......... 455/456.1, 455/466
See application file for complete search history.

(56) References Cited

U.S. PATENT DOCUMENTS

| | | |
|---|---|---|
| 7,249,159 B1 | 7/2007 | Horvitz et al. |
| 2003/0117994 A1* | 6/2003 | Fujii ............... 370/349 |
| 2004/0219908 A1* | 11/2004 | Ganor ............... 455/422.1 |
| 2006/0003766 A1 | 1/2006 | Parameswar et al. |
| 2006/0252438 A1* | 11/2006 | Ansamaa et al. ...... 455/503 |
| 2009/0311992 A1 | 12/2009 | Jagetiya |
| 2011/0130139 A1* | 6/2011 | Ali et al. ............ 455/435.1 |

FOREIGN PATENT DOCUMENTS

EP  2 224 682 A1  9/2010

OTHER PUBLICATIONS

Extended European Search Report issued in European Patent Application No. EP 11001268.9 dated Apr. 12, 2011.

* cited by examiner

*Primary Examiner* — Kamran Afshar
*Assistant Examiner* — Joseph Dean, Jr.

(57) ABSTRACT

A delivery period for delivering messages including a notification is determined. A location of a mobile station user is identified. A time zone difference between the location of the mobile station user and a location of a server for delivering the messages is calculated. The delivery period for the notification message is adjusted based on the time zone difference so that the mobile station user receives and confirms the messages at his or her best-acceptable time.

22 Claims, 4 Drawing Sheets

BUSINESS HOUR NOTIFICATION DELIVERY

FIELD OF THE INVENTION

The present subject matter relates to delivery of notification messages of a mobile service provider to wireless communication subscribers at subscribers' acceptable times, based on time zones of respective subscribers' locations.

BACKGROUND

In recent years, mobile wireless communications have become increasingly popular. Initial implementations of mobile wireless communications, for example in the form of cellular telephone networks, supported circuit switched voice communication services. Mobile voice telephone communications is now ubiquitous in many countries, and mobile services are replacing fixed landline service even for traditional voice telephone calls. However, for many years now the mobile service offerings have extended far beyond the traditional voice telephone call model.

For example, the mobile carriers developed short messaging service (SMS) technology to provide text and/or email communications via the wireless communication networks. As the public wireless communication networks have evolved to provide greater bandwidth and packet based services, the industry has developed a variety of data services, such as web browsing, as well as a variety of services using multimedia messaging service (MMS) technology. Many of the messaging services such as SMS and MMS support message traffic between mobile stations, e.g. for message exchange between users. However, these popular messaging services also support traffic between mobile stations and server equipment from which service providers offer users a variety of different types of application services.

The wireless communication service provider needs a way to notify the subscribers of important information such as a billing, and changes of services or terms. Hence, the providers have deployed systems and developed processes to send SMS or MMS messages including the notification information to the subscribers of the wireless communication service. Since the service provider would like to ensure that the SMS or MMS notification messages are read by the subscribers or the mobile station user does not want to be interrupted by receipt of the SMS or MMS notification messages during hours of sleep, it is preferable that the notification messages be sent to the subscribers at easily-acceptable times, such as during business hours (e.g. 9 AM-5 PM).

For a large service provider the messages could be generated and sent to a lot of subscribers or other users at the same time, e.g. from one or more data centers. However, the mobile station users may be located at areas in various time zone, which may differ from the time zone where the equipment sending the notification messages. So, this location of the mobile station users (subscribers) in diverse time zone areas makes it hard for the service provider to consistently send the messages to each of the mobile station users during business hours of their respective areas.

A need exists for a technique for sending notification messages to mobile stations users, for example in SMS or MMS messages, where the users are located in various time zone areas, at acceptable times appropriate for various different users' time zones.

SUMMARY OF THE INVENTION

The teachings herein address one or more of the above noted needs relating to a method and a system for sending service-related notifications to a mobile station user at a best acceptable time.

The teachings below encompass a method for sending a notification to a mobile station user via a wireless communication network. A server receives a request for sending of the notification, in a mobile messaging service message to the mobile station user, from a system of a mobile communication service provider. The notification may be a service related notifications provided by the wireless service provider or any notifications provided by a third party entity. The server determines a delivery period within which it is appropriate to send any notification messages to the mobile station user, and identifies a location associated with the mobile station user. A time zone difference between the identified location and an area where the server is located is calculated. The delivery period is adjusted based on the time zone difference for each of the mobile station user, and the mobile messaging service message containing the notification is sent through the wireless communication network for delivery to the mobile station user during the adjusted delivery period. Instead of the mobile message service message, any type of communication ways may be used.

The location may be identified responsive to a determination that the notification is of a type to which a delivery period restriction applies. The location may be identified by retrieving an address of the mobile station user from a system of record for a subscriber account associated with the mobile station. The location may be identified by identifying a current locations of operation of the mobile station of the user. The location may be identified identifying a time zone preference previously selected by the mobile station user.

The step of adjusting the delivery period is performed by adding the time zone difference to the delivery period to obtain the adjusted delivery period, and queuing the mobile messaging service message containing the notification with other notification messages by encoding the adjusted delivery period into the mobile messaging service message containing the notification.

Another aspect of the disclosure encompasses a system for sending the notification to a mobile station user via a wireless network. The system may include a system of record for storing information of mobile station users including location information of the mobile station user, an originating message center for generating a mobile messaging service message including the notification, and a centralized customer communication server (CCCS) for calculating a time zone difference between the location of each of the at least one mobile station users and an area where the originating message center is located. The CCCS may be a third party external short message entity (ESME), or a Short Message Service Center (SMSC) of either of a home wireless network or a third party external wireless network for the mobile station user.

The calculation of time zone difference may be performed by referring to the location information of the mobile station user in the system of record, and the delivery period for the message is adjusted based on the calculated time zone difference. The messages generated by the originating message center is delivered to the mobile station during the adjusted delivery period.

The location information of the mobile station user may be obtained by referring to location calculated from the GPS signals. A positioning determining entity (PDE) determines the location of the mobile station of the mobile station user by using Global Positioning System (GPS) signals received at the mobile station. The determined location of the mobile station may be stored in the system of record. The location of the mobile station user may be determined based on addresses of the at least one mobile station stored in the system of record. The location of the mobile station user may be determined based on a time zone preference selected in advance by the mobile station user.

Other concepts relate to unique software for implementing a notification technique of the type outlined above. A software product, in accord with such a concept, includes at least one machine-readable medium and information carried by the medium. The information carried by the medium may be executable program code and/or information regarding acceptable period, user locations and/or time zone adjustments for generating and sending notification messages for delivery at appropriate times. Execution of the program causes a computer or the like to implement functions similar to the steps of the notification methodology discussed earlier.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTIONS OF DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The examples described below encompass a technique that sends a mobile station user notifications at the user's easily acceptable times appropriate for the user's time zone. The notifications include any type of messages, for example, notifications provided by a wireless communication service provider, notifications provided by another service provider to notify the user of some service or account related information and any notifications provided by entity involved in wireless communications. In response to a request for sending such a service or account related notification, a Centralized Customer Communication System (CCCS) retrieves and identifies business rules specific to the user which includes information on when the notifications should be sent to the user. A delivery period for sending the notifications are determined based on the business rules. The CCCS identifies an area of the mobile station user and adjusts the delivery period based on the area of the mobile station user. A message including the notifications are sent during the adjusted delivery period. The user can receive the message including the service or account related notification at a time when the user easily receives and confirms the message.

Figure 1:
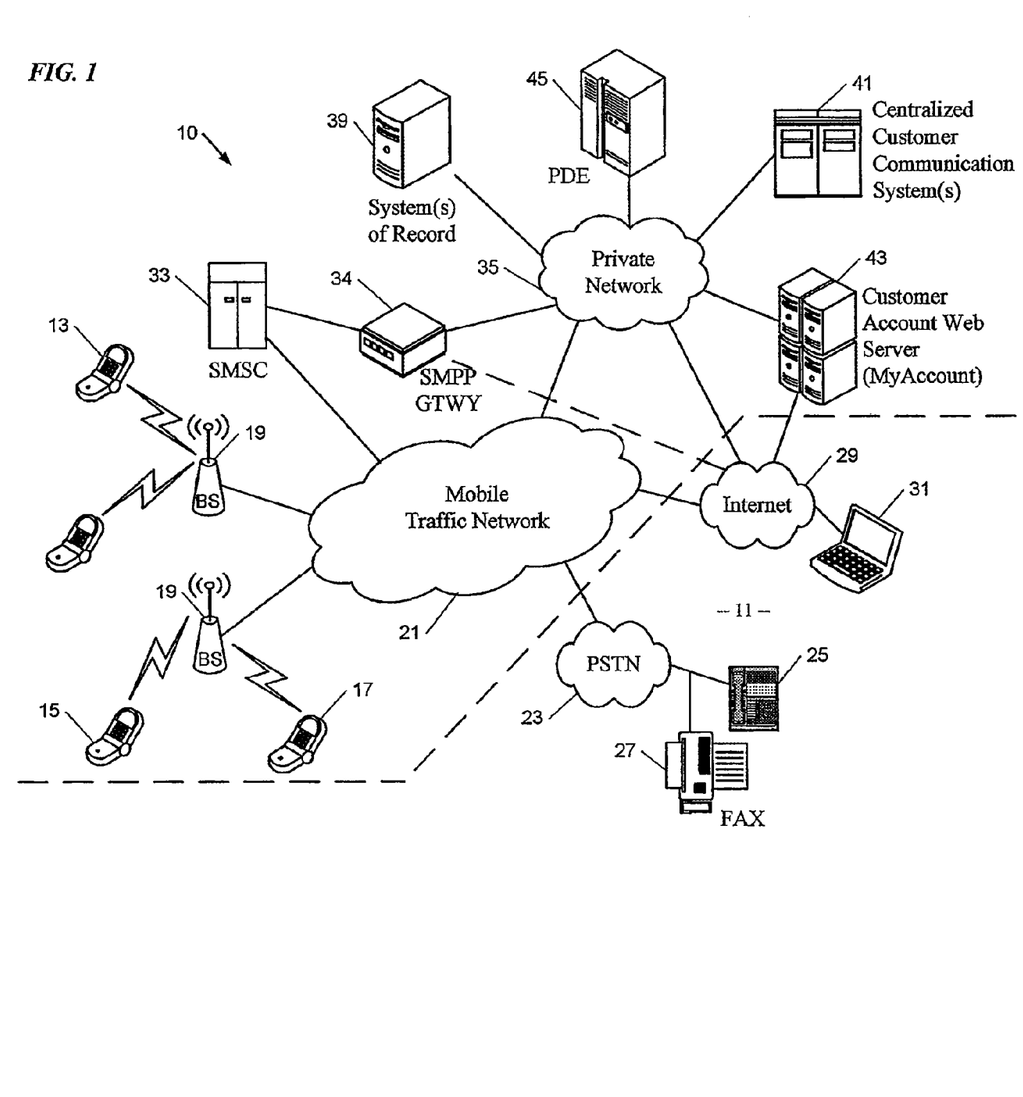
FIG. 1 is a functional block diagram useful in understanding networked elements/systems that may be used in providing mobile service subscribers various notifications, upon occurrence of certain types of changes in the subscribers' accounts.

Reference now is made in detail to the examples illustrated in the accompanying drawings and discussed below. To fully appreciate the timing adjustment of notification delivery, it may be helpful to discuss a service provider's network as well as the systems for generating and delivering notification messages to the mobile station's users. FIG. 1 illustrates a number of mobile stations, a mobile communication network coupled to other communication networks and several systems/elements associated with or included in the mobile network for various functions as may be involved in managing subscriber accounts, allowing subscribers to change at least some account information and provide attendant subscriber notifications of the changes.

Hence, FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations 11 outside the mobile communication network 10.

For purposes of later discussion, several mobile stations appear in the drawing, to represent examples of the mobile stations that may receive various services via the mobile communication network 10. Today, mobile stations typically take the form of portable handsets, smart-phones or personal digital assistants, although they may be implemented in other form factors. For discussion of some of the notification scenarios, we will assume that the mobile stations 13, 15 and 17 and their associated MDNs are all covered under one subscriber account, and that among those stations, the mobile station 13 is the station of the account holder (AH).

The network 10 allows users of the mobile stations to initiate and receive telephone calls to each other as well as through the public switched telephone network (PSTN) and telephone stations connected thereto. The network 10 allows SMS type text messaging between mobile stations and similar messaging with other devices via the Internet. The network 10 typically offers a variety of other data services via the Internet, such as downloads, web browsing, email, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as the MMSCs. A regional portion of the network 10, such as that serving mobile stations 13, 15 and 17, will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, 15 and 17, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 and 17 between the base stations and other elements with or through which the mobile stations communicate. Individual elements such as switches and/or routers forming the traffic network 21 are omitted here for simplicity.

A Mobile Directory Number (MDN) or Mobile Telephone Number (MTN) is the telephone number assigned to a mobile station, which a calling party or device inputs in order to call or send a message to the particular mobile station. To call the mobile station 15, for example, a user of a PSTN telephone or of another mobile station dials the MDN associated with the mobile station 15. To send a MMS message or a SMS message to destination mobile station 15, as another example, typically entails input of the MDN of that mobile station. A Mobile Identification Number (MIN) is an identification number used by the network 10 to signal a particular mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations and is the number or address of the mobile station that appears in billing and account records and is accessible via web site or call-in account services.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25. For purposes of discussing notifications, some notifications may entail voice message delivery or even service representative calls to the account holder, for example, at a regular telephone such as telephone 25 via the PSTN 23. The PSTN 23 also provides connections to other types of customer premises equipment, such as facsimile or TAX' machines. The drawing shows one FAX machine 27, by way of example, to illustrate the point that a subscriber or account holder notification may entail a facsimile transmission of the notification message to the subscriber's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, email, web surfing or browsing, programming and media downloading, etc. For example, the mobile stations may be able to receive messages from and send messages to user terminal devices, such as personal computers, either directly (peer-to-peer) or via various servers (not separately shown). The drawing shows one such user terminal device as a personal computer (PC) at 31, by way of example. For purposes of discussing notifications, some notifications may entail an email message transmission of the notification to the subscriber's data terminal, such as to the PC 29 via the Internet 29.

Wireless carriers developed the short message service (SMS) to transmit text messages for display on the mobile stations. In many existing network architectures, the SMS traffic uses the signaling portion of the network 21 to carry message traffic between a Short Message Service Center (SMSC) 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway provides protocol conversions, between SMPP as used by the SMSC 33 and the protocols used on the Internet 29 or other IP network. SMPP messages ride on IP transport, e.g. between the gateway 34 and the SMSC 33

Of note for purposes of this discussion, many of the notifications discussed herein are sent to various mobile stations using SMS capabilities of the network 10. For example, when there is a change in a subscriber's account warranting notification, the network 10 will provide an appropriate notification in the form of an SMS message sent via the SMPP gateway 34, the SMSC 33, the traffic network 21, one of the base stations 19 and a signaling channel over the air link to the mobile station 13 of the subscriber/account holder. When an external (third party) content provider or another wireless network service provider generates and sends a notification to the mobile station 13 via the home wireless network 10, an external short message entity (ESME) or a SMSC of the another wireless network service provider may generate a message including the notification and delivers the message via the ESME, SMPP gateway 34, SMSC and the traffic network 21.

As discussed more later, the system 10 will determine if the SMS transmission successfully provided notification to the mobile station 13, and if not will initiate one or more alternative notification procedures to other destinations designated for possible notice to the particular subscriber/account holder.

The carrier will also operate a number of systems that provide ancillary functions in support of the communications services provided through the network 10, and those elements communicate with other nodes/elements of the network 10 via one or more private IP type packet data networks 35 (sometimes referred to as an Intranet). The support elements, for example, include one or more systems of record, such as the system shown at 39. An example of such a system 39 is a Vision system, which includes subscriber account records. A large carrier typically has a number of such systems, and the system that stores the account data for a particular subscriber may be referred to as the "system of record" for that subscriber's account.

As discussed more later, with regard to FIG. 2, the centralized customer communications system (CCCS) 41 also includes or has access to a preference center system 53 that forms a system of record, which includes a record for the mobile stations 13, 15 and 17. That record identifies the mobile stations 13, 15, 17, and the MDN of the mobile station identified as the account holder (AH) for subscriber notification purposes.

The exemplary network 10 also includes a CCCS 41, which is coupled for communication via the private network 35. The CCCS 41 receives notification requests from various other carrier systems and generates and sends the requested notifications. In some cases, the CCCS 41 also updates information in system(s) of record, as part of its processing in response to the notification requests. As discussed more later, the notification message delivery timing is based on one or more rules and is adjusted based on location information regarding each user intended to receive a notification.

The notification to be sent to the mobile station may include marketing messages, usage notifications, or reminders from the wireless network service provider or the external content or service provider. For example, the CCCS 41 may generate and send SMS messages, typically including at least one to the mobile station 13 designated as that of the account holder, in response to need for sending the notification. In the examples discussed in more detail below, the CCCS 41 also supports alternative messaging, for example, in the form of facsimile, voice or email messages, and/or letter mailings which are used for account change notifications or the like, e.g. to provide notifications of significant account activities such as on-line access to add a number/station. The rules typically will specify notification delivery during a 'business hours' period, but the period can be adjusted based on user specific location information.

In practice today, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount' (Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29. Of note for purposes of the present discussions of notifications, the web site provides secure user access to enter and/or otherwise change various aspects of the subscriber's account related information. The website also may allow the subscriber to designate the MDN for the account holder's mobile station 13.

With that overview of the system, it may be helpful now to consider a high-level discussion of an example of service related changes, including how these service changes might appear from the user or subscriber's point of view. Assume now that the subscriber has an account with the carrier operating the mobile network and has access to account related functions/services through MyAccount or MyVerizon, via the Internet 29 and the server 43. For example, the service provider changes a service and needs to send a notification related to the service change to the mobile station user.

For example, upon need for sending the notification, the server 43 communicates with other network systems via the private network 35, for example, to reflect the need for sending the notification in one or more of the systems of record 39 and 53. For example, the server 43 sends a message through the network 35 to the Vision system 39 informing e.g. data usage. The server 43 also sends a notification request to the CCCS 41, which will cause the CCCS 41 to send one or more notifications.

The CCC request processor in the CCCS 41 will initially generate an SMS message to notify the subscriber using the previously designated account holder MDN, to notify the subscriber of the service change. If not successful, one or more alternative notifications may be sent, in accord with the applicable business rules, as discussed more later. However, the notification request from the server 43, per the business rules, also causes the CCC request processor to set the Email Address and the account holder designation appropriately in the preference center 53 if when that information is input or changed.

Mobile station user's location related information such as address, user's preferred location, and current location determined based on e.g. Global Positioning System (GPS) signals, may be stored in the System of Record 39. The mobile station user's location may be updated and stored in the System of Record 39, once the mobile station user's location is updated. A Position Determining Equipment (PDE) 45 is provided to find current location of the mobile station user by using GPS signals received from GPS satellites. The PDE is essentially a general purpose programmable device with an interface for data communication via the network running server software and running programming for implementation of the PDE 45 functions. The PDE 170 stores (e.g. in cache memory) or has access to a complete and up to date set of the satellite data for the constellation of GPS satellites needed to allow computation of position based on pseudorange measurements from satellite signals as received from the mobile station.

Figure 2:
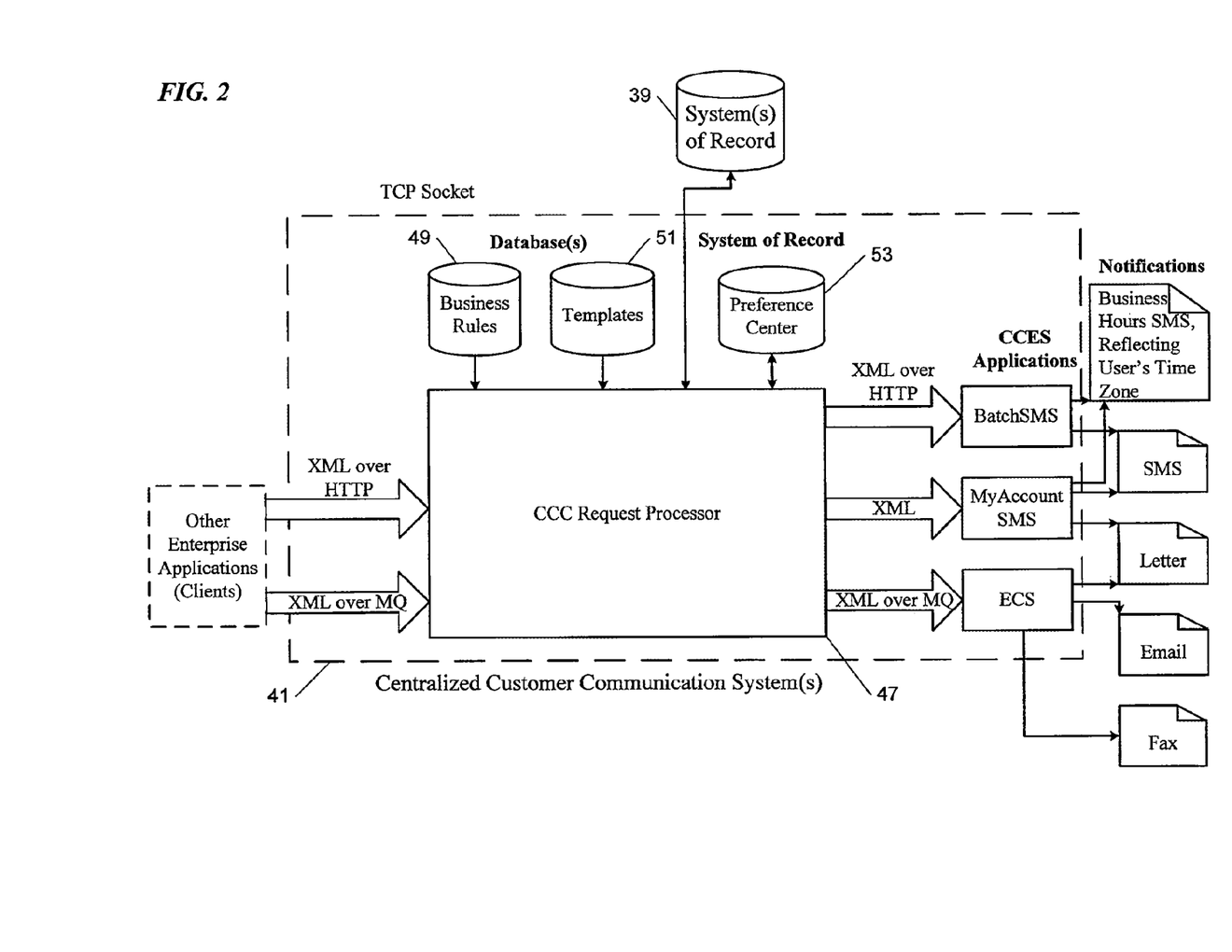
FIG. 2 is a functional block diagram useful in explaining an implementation of a customer communication system involved in providing reliable notifications to mobile subscribers.

FIG. 2 depicts software and associated functionalities, in block diagram form, where the software may be run on the hardware of a host or server type computer or system of such computers, to implement the CCCS 41; and that drawing illustrates several other elements that communicate with that system for providing notifications to mobile users, including those provided when there is a change in relevant account information. For example, the drawing shows the systems of record 39 and 53, in this case a Vision type billing system 39 and the preference center 53. In the example, the customer communication system is implemented as an enterprise middleware web service written in Java that receives notification requests in the form of XML via HTTP or MQ, and follows business rules to send customer notifications and update systems of record. In general, these communications may utilize the CCCS web services to facilitate the sending of text message, Email, letter, and fax notifications. Hence, the CCCS 41 may be implemented as middleware, that is to say, in this example, as software for implementing a CCC notification request processor 47, one or more databases 49 and 51, and a directory 53, as will be discussed in more detail below.

Although shown as a common platform at 41 in FIG. 1, the elements of the CCCS 41 of FIG. 2 may be implemented on separate hardware communicating with each other via a network the same as or similar to network 35. For example, one or more of the databases 49, 51 and 53 typically will be implemented as separate servers in communications with the hardware platform(s) implementing the CCC notification request processor 47, although the databases may be implemented as records and appropriate application software running on the same computer as the middleware for the CCC notification request processor 47. The preference center directory 53, for example, may be implemented as a LDAP server coupled for communication with the computer running the CCC notification request processor 47 programming.

The CCC notification request processor 47 receives notification requests, processes them and provides the processed requests to associated messaging applications that send the desired notifications out via one or more delivery techniques. In the illustrated implementation, the CCC notification request processor 47 provides such notification services for a number of enterprise applications. For example, enterprise applications such as MyVerizon running on the web server 43 may trigger notifications of certain activities on a subscriber's account, such as when a customer uses the on-line web service through server 43 to change their address, email address, MyAccount challenge question, MyAccount password, MyAccount secondary email addresses, or Vision password. In any such case, the CCC request processor 47 will send a notification to the customer following specific notification logic and provide fallout files by area when the notification cannot be made.

The customer communication system 41 will include or have communication access to a number of databases that store information used in performance of various notifications related functions. In the example, the CCCS 41 includes a database 49 of business rules and a database 51 of notification message templates. The rules in the database 49 provide the logic for determining what notifications to send in response to the various service changes made on enterprise applications, and when the notifications are sent to users. The template database 51 provides the format and common content, e.g. forms or templates, for the various notification messages sent out by the CCCS 41.

The Preference Center is the system of record for communication preferences and account holder designation. Communications with this system of record 53 provide the CCC request processor 47 with information that is useful in processing of various notifications, including notifications regarding account. The systems 53 and 41 communicate using XML, via the network 35, to store and retrieve the preference and account holder data from system 53.

Thus, the preference center directory 53 stores preference data regarding notifications for various network customer accounts that may be subject to notifications. The preference center directory 53, for example, stores the MDN of the account holder as designated by the subscriber. The directory may store other notification preference information for the subscriber account, for account change notifications and/or for other notifications that the carrier may want to provide to the subscriber, such as other notification destination addresses, etc. The language for the notification also may be specified by a field, e.g. as provisioned in the web server. The CCC request processor 47 communicates with the Preference Center application that updates its directory 53 using the Lightweight Directory ACCCSs Protocol (LDAP).

The CCCS 41 also runs one or more message output applications, identified as CCCS applications in FIG. 2, for processing the notification request messages output from the CCC notification request processor 47, as needed to generate and send the actual notification messages through one or more communication delivery channels. The CCC notification request processor 47 modifies notification request messages based on its processing and outputs the modified notification request messages in XML format to the appropriate one or more of the CCCS applications, to send the actual notifications. The CCCS applications comprise application programming software, which may run on the same or a different computer from the CCC notification request processor 47.

The CCCS applications enable the CCCS 41 to provide notifications, including notifications regarding account changes, and notifications for the other enterprise applications, using a number of communication techniques, as shown by way of example to the right of FIG. 2. Some messages may be batch processed for SMS communications or sent in real time in response to triggering events as represented by the MyAccount SMS processing in the drawing. Event responsive notifications would be sent in real-time as the change events are detected and processed through the CCCS 41. The customer communication system 41 also supports other types of notifications, such as email, letter, or facsimile transmissions via an Enterprise Communication Services (ECS) function.

The CCCS 41 could be implemented on a single hardware platform. However, to provide effective notification services for a large number of customers and a large volume of trigger events or enterprise applications requiring notification, including various account data changes, the customer communication system 41 may utilize a distributed system architecture. The exemplary system architecture will be highly available and fault tolerant. Those skilled in the art will recognize, however, that other system architectures may be used, e.g. to meet the demands of increased event and notification traffic for account changes and/or other enterprise applications that require customer notifications.

The CCCS software for notification services may be written in Java. Each CCCS Notification Server node in the example has an instance of Websphere running the CCCS notification software and the CCC/MyAccountSMS software on the same Java Virtual Machine (JVM). This allows the account change notifications to utilize all of the features of the customer communication system including: SMS notifications, EMS notifications, MMS notifications, Email notifications, fax notifications, letter notifications, notification templates, rules based failure notifications, preference center lookups, and weekly reports. EMS (Enhanced Messaging Service) is an application-level extension to Short Message Service (SMS) for cellular phones available on GSM, TDMA and CDMA networks. The CCC software, for example, makes the preference center lookups on the account number provided in the notification request to send SMS notifications to the Account Holder. The CCC software also updates preference center records for subscribers to reflect account changes, responsive to the account registration and change notification requests.

Figure 3:
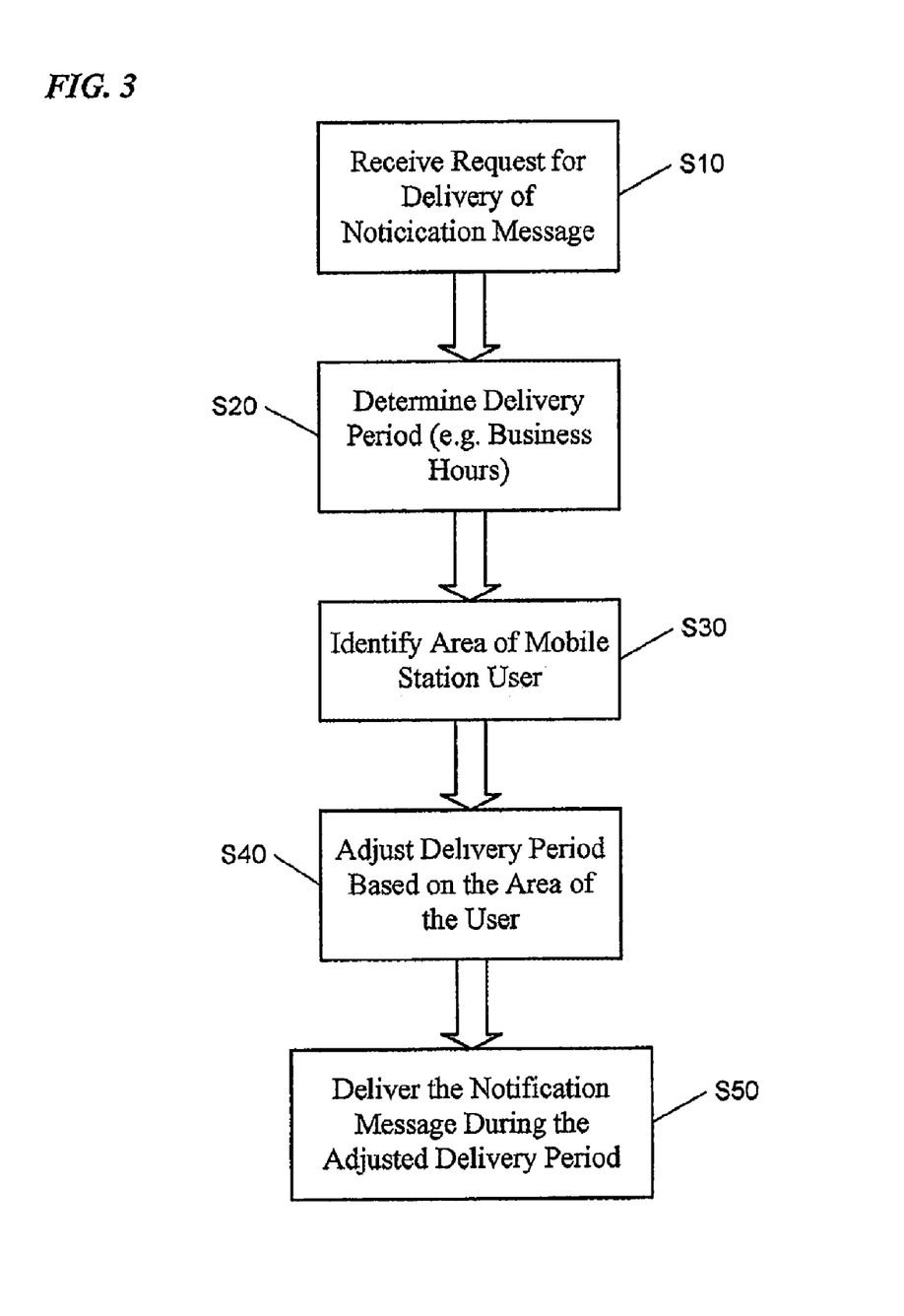
FIG. 3 is a flow diagram which illustrates a process to send a service related notification to a mobile station user via a wireless communication network.

FIG. 3 is a flow diagram which illustrates a process to send a service related notification to a mobile station user via a wireless communication network. A wireless communication service provider needs to send service-related notifications to a mobile station user. A third party content or service provider needs to send the mobile stations user notifications regarding its content or service. The wireless communication service provider or the third party content service provider sends a request for sending notifications to the mobile station user, and the CCCS 41 receives the request via the wireless network 10 from an equipment of the wireless communication service provider or the third party content provider. (S10) The request takes a form of XML via HTTP or MQ. The request includes mobile stations user's identification information, and the CCCS 41 retrieves and checks business rules specific to the type of notification and specific to the user based on the user's identification information. For purposes of this discussion, one of the applicable business rules indicates whether the notifications need to be sent during a specific delivery period, for example, during business hours.

If the business rules require the notifications to be sent to the user during a specific delivery period, the CCCS 41 determines a delivery period for the user, during which the user can receive the notification best and promptly. (S20) The delivery period may be time when the user is at his office or working place, and ready to confirm any received messages, e.g. people's working hours (9 AM-5 PM).

Since the mobile station user stays at various time zone areas, and one mobile station user changes his or her location several times during one day, the people's working hours change depending upon location of the mobile station user. The CCCS 41 may identify the area of the user in several ways as discussed below. Since the mobile station user stay at various time zone areas, the time zone of an originating message center's location may differ from the mobile station's time zone. This time zone difference between the mobile station's location and the location of the originating message center requires the delivery period of the originating message center to be adjusted according to the time zone difference. As an initial step for adjusting the delivery period, CCCS 41 identifies an area of the mobile station user in order to send the notifications at a best acceptable delivery period due to this ubiquitous characteristic of the mobile station user's location. (S30)

One embodiment of identifying the time zone of the mobile station user is to refer to location of the mobile station user stored in the system of record 39. The location of the mobile station user stored in the system of record 39 is the location which the mobile station user registered as his location when opening his or her mobile station account, and may be in a form of zip code. The zip code in the system of record 39, however, cannot reflect dynamic change of user's location.

Another embodiment of identifying the time zone of the mobile station user is to determine an area of the mobile station based on a user's preferred time zone, which may be stored in the system of record 39 in advance by the user. The user's preferred time zone may not reflect dynamic change of user's location, either; however the user may be able to change this preference from time to time for example via web access. In this way, the user might change the preference away from home for an extended period and reset it upon returning home.

A third embodiment of identifying an area of the mobile station user is to determine the time zone of the mobile station by referring to a location where the mobile station user called last. Since the location where the user called last is likely to be the same time zone area as the location where the user stays now, the time zone of user's present location may be identified based on the location where the user called last. The location where the user last called is stored in the system of record 39.

A fourth embodiment of identifying an area of the mobile station user is to find a location of the mobile station by using GPS signals. A positioning determining entity (PDE) 45 determines the location of the mobile station by using Global Positioning System (GPS) signals received at the mobile station. The mobile station receives GPS signals from at least three GPS satellites and sends the GPS signals via the wireless network to the PDE 45. The PDE 45 calculates current location of the mobile station based on the GPS signals received at the mobile station. The time zone of the user can be determined based on the mobile station's location.

After the time zone of the mobile station user is identified, the delivery period determined in the step S20 is adjusted based on the time zone of the user. (S40) If the CCCS 41 sends messages including the notifications without considering each user's time zone, the user may not receive the messages at his or her best-acceptable time owing to a time zone difference between the user's location and the location of the CCCS 41, even if the messages are sent out to the user during the delivery period that is best-acceptable time according to the business rule. For example, when the CCCS 41 is located in the Eastern Time zone and the mobile station user is located in the Pacific Time zone, even though the delivery period defined by the business rule is 9 AM-5 PM, the mobile station user may receive the messages during 6 AM-2 PM, if the time zone difference is not considered. Thus, the delivery period needs to be adjusted considering the time zone difference between the location of the mobile station user and the location of the CCCS 41.

For adjustment of the delivery period, the time zone difference between the location of the CCCS 41 and the location of the user is added to (or subtracted from) the start time and the end time of delivery period. In the above example, the delivery period for the user located in the Pacific Time zone is adjusted by adding 3 hours to the delivery period defined by the business rule, i.e. 12 AM-8 PM(ET).

The adjustment of the delivery period is performed for each of the messages. The adjusted delivery period is added in a header of each message together with the notification XML, and each message embedded with adjusted delivery period placed in a dedicated queue. A JMS Queue receiver embedded in the CCCS 41 polls the queue on a certain interval to select messages for which current time of the CCCS's location is between the start and end time for delivery of the messages. After the messages are selected, the messages including notification XML are delivered to the mobile station according to the adjusted delivery time. (S50).

Figures 4, 5:
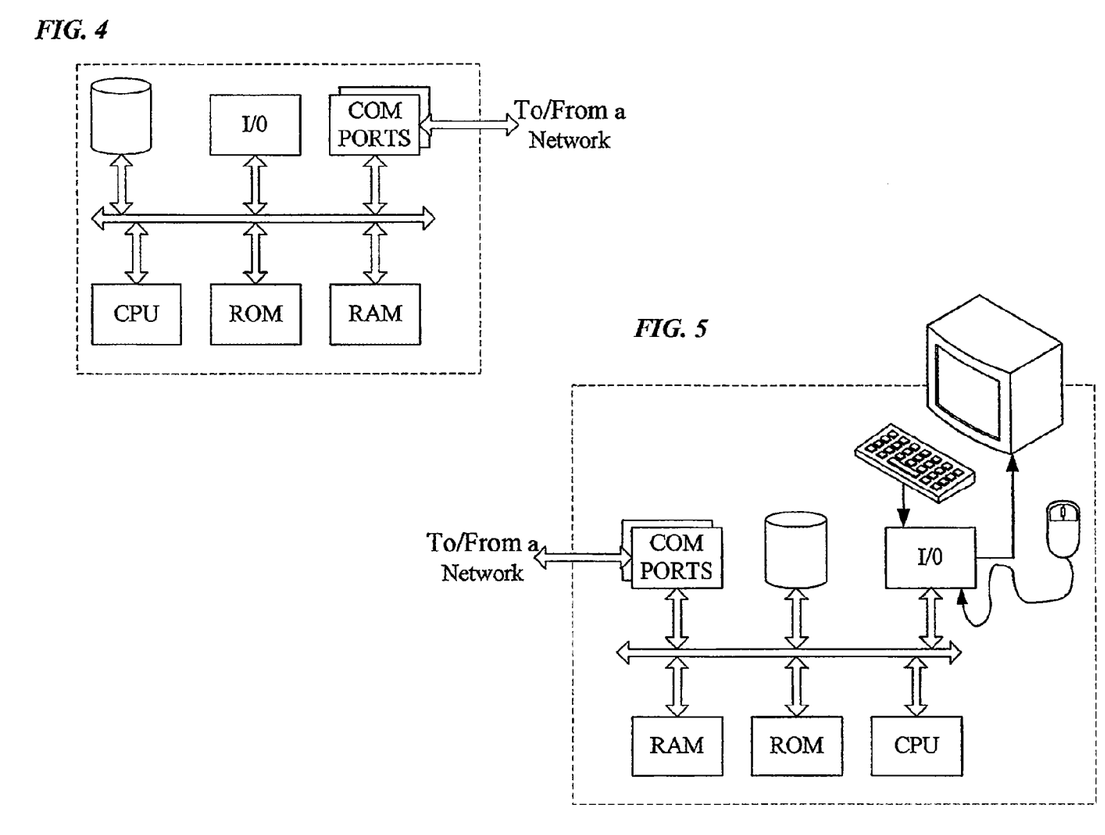
FIG. 4 illustrates a network or host computer platform, as may typically be used to implement a server.
FIG. 5 depicts a computer with user interface elements, as may be used to implement a personal computer or other type of work station or terminal device

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 4 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of sending service-related notifications, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the catalog manager, the API, the media store platform, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for sending a notification to a mobile station user via a wireless communication network, the method comprising steps of:
receiving at a server a request for sending of the notification, in a message to the mobile station user, from a system of a mobile communication service provider;
determining a delivery period within which it is appropriate to send any notification messages to the mobile station user; identifying a location associated with the mobile station user; calculating a time zone difference between the identified location and an area where the server is located; adjusting the delivery period based on the time zone difference; and sending the message containing the notification through the wireless communication network for delivery to the mobile station user during the adjusted delivery period, wherein the step of adjusting includes: combining the time zone difference and the delivery period to obtain the adjusted delivery period; embedding the adjusted delivery period into the message containing the notification; and queuing the message containing the notification with other notification messages using the embedded adjusted delivery period.

2. The method of claim 1, wherein the step of identifying the location is responsive to a determination that the notification is of a type to which a delivery period restriction applies.

3. The method of claim 1, wherein the step of identifying the location is performed by retrieving a billing address of the mobile station user from a system of record for a subscriber account associated with the mobile station.

4. The method of claim 1, wherein the step of identifying the location is performed by identifying a current location of the mobile station of the user.

5. The method of claim 1, wherein the step of identifying the location is performed by identifying a time zone preference previously selected by the mobile station user.

6. The method of claim 1, wherein the message includes at least one of a multimedia message service (MMS) message, a short message service (SMS) message and a voice message.

7. The method of claim 1, wherein the notification includes a service related notification provided by a wireless communication provider, a notification provided by a third party service or content provider and a notification provided by a mobile station.

8. A system for sending a notification to one of a plurality of mobile station users via a wireless network, comprising:
a system of record for storing information of the mobile station users including location information of the one mobile station user; an originating message center for sending messages including a message containing the notification for the mobile station user;
and a centralized customer communication server (CCCS) for: determining a delivery period within which it is appropriate to send any notification message to the one mobile station user; calculating a time zone difference between the location of the one mobile station user and an area where the originating message center is located by referring to the location information of the one mobile station user in the system of record; adjusting the delivery period for the message containing the notification based on the calculated time zone difference, and instructing the originating message center to deliver the message to the one mobile station user during the adjusted delivery period, wherein the adjusting the delivery period includes: combining the time zone difference and the delivery period to obtain the adjusted delivery period; embedding the adjusted delivery period into the message containing the notification; and queuing the message containing the notification with other notification messages using the embedded adjusted delivery period.

9. The system of claim 8, further comprising
a positioning determining entity (PDE) for determining the location of the mobile station of the one mobile station user by using Global Positioning System (GPS) signals received at the mobile station, wherein the determined location of the mobile station is stored in the system of record.

10. The system of claim 8, wherein the location of the mobile station user is determined based on billing addresses of the at least one mobile station stored in the system of record.

11. The system of claim 8, wherein the location of the mobile station user is determined based on a time zone preference selected in advance by the mobile station user.

12. The system of claim 8, wherein the originating message center is an external short message entity (ESME).

13. The system of claim 8, wherein the originating message center is a Short Message Service Center (SMSC) of either of a home wireless network or an external wireless network for the mobile station user.

14. The system of claim 8, wherein the message includes at least one of a multimedia message service (MMS) message, a short message service (SMS) message and a voice message.

15. The system of claim 8, wherein the notification includes a service related notification provided by a wireless communication provider, a notification provided by a third party service or content provider and a notification provided by a mobile station.

16. An article of manufacture comprising: a non-transitory machine readable storage medium; and instructions for causing a programmable computer to implement functions for sending a notification to a mobile station user via a wireless communication network, the functions comprising: receiving a request for sending of the notification, in a message to the mobile station user, from a system of a mobile communication service provider; determining a delivery period within which it is appropriate to send any notification messages to the mobile station user;
identifying a location associated with the mobile station user; calculating a time zone difference between the identified location and an area where the server is located; adjusting the delivery period based on the time zone difference; and sending the message containing the notification through the wireless communication network for delivery to the one mobile station user during the adjusted delivery period, wherein the function of adjusting includes: combining the time zone difference and the delivery period to obtain the adjusted delivery period; embedding the adjusted delivery period into the message containing the notification; and queuing the message containing the notification with other notification messages using the embedded adjusted delivery period.

17. The article of manufacture of claim 16, wherein the step of identifying the location is responsive to a determination that the notification is of a type to which a delivery period restriction applies.

18. The article of manufacture of claim 16, wherein the step of identifying the location is performed by retrieving a billing address of the one mobile station user from a system of record for a subscriber account associated with the mobile station.

19. The article of manufacture of claim 16, wherein the step of identifying the location is performed by identifying a current location of the mobile station of the user.

20. The article of manufacture of claim 16, wherein the step of identifying the location is performed by identifying a time zone preference previously selected by the mobile station user.

21. The article of manufacture of claim 16, wherein the message includes at least one of a multimedia message service (MMS) message, a short message service (SMS) message and a voice message.

22. The article of manufacture of claim 16, wherein the notification includes a service related notification provided by a wireless communication provider, a notification provided by a third party service or content provider and a notification provided by a mobile station.

* * * * *